Sept. 27, 1932.  E. MENDENHALL ET AL  1,879,628
SUBMERSIBLE MOTOR WITHOUT OIL SUPPLY MEANS
Filed Feb. 3, 1932
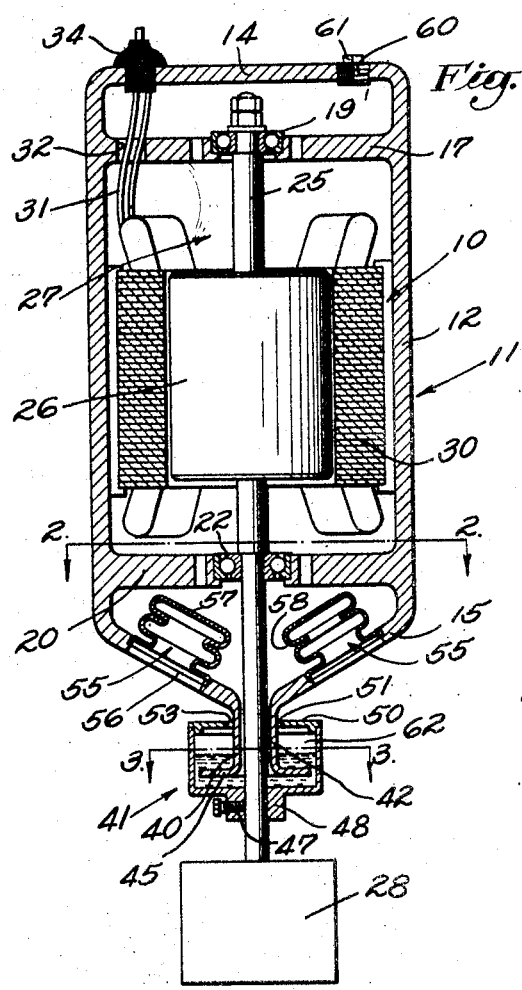
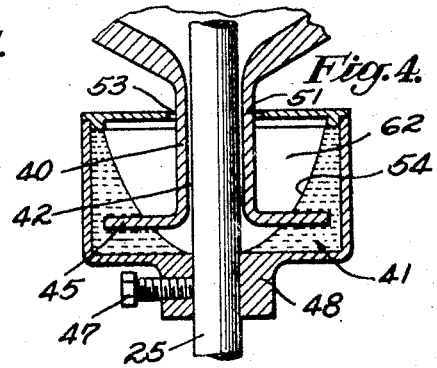
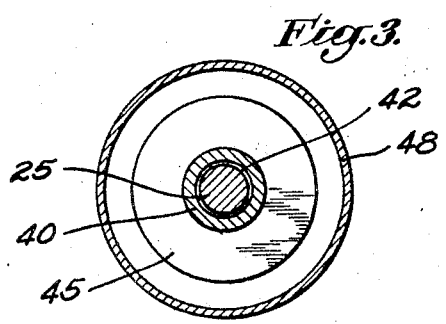
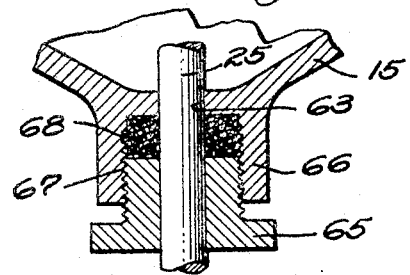
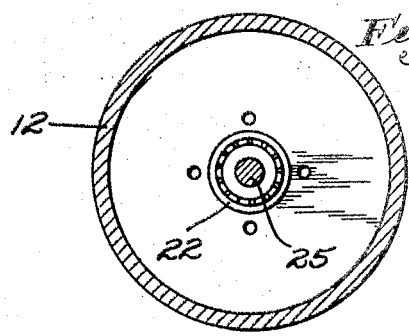
INVENTORS:
EARL MENDENHALL,
JUNIUS B. VAN HORN,
By
ATTORNEY.

UNITED STATES PATENT OFFICE

EARL MENDENHALL AND JUNIUS B. VAN HORN, OF LOS ANGELES, CALIFORNIA

SUBMERSIBLE MOTOR WITHOUT OIL-SUPPLY MEANS

Application filed February 3, 1932. Serial No. 590,624.

Our invention relates to motors and more particularly to a submersible motor.

It is often desirable to operate an electric motor completely submerged in a fluid which would be injurious to the working parts of said motor should any leakage occur. Such a condition is frequently met in the pumping and drilling arts. Heretofore the difficulty encountered has been in the design of an effective seal for preventing any leakage of the pumped fluid into the bearings or other working parts of the motor.

It is an object of our invention to provide a motor or other prime mover which will successfully operate in a fluid which would be injurious to the working parts of the motor should it enter therein.

It is a further object of our invention to provide a device for effectively sealing the working parts of such a motor from the fluid in which the motor is submerged.

It is a further object of our invention to provide such a seal that is effective irrespective of the rotation of the motor.

We have found that by placing a suitable fluid-packed seal at the junction of the shaft and the shell of the motor that an effective seal is maintained at all times.

It is an object of our invention to provide a motor having a fluid-packed seal.

A further object of our invention is to provide a motor in which the pressure inside the shell is equal to the external pressure of the fluid in which the motor is operated.

It is often undesirable to continuously supply a lubricating medium to the bearings of such a submerged motor, especially where the distance from the motor to the surface of the fluid is relatively large.

It is an object of our invention to provide a motor which is permanently packed with a lubricating medium.

A further object of our invention is to provide a motor which operates in a body of lubricating medium.

Certain of the features of this invention are not of necessity limited to a combination with an electric motor, but find utility in other submersible structures, and further objects of the invention lie in the provision of a novel submersible structure.

Further objects and advantages of our invention will be made evident hereinafter.

In the drawing:

Fig. 1 is a vertical cross-sectional view of the motor of our invention.

Fig. 2 is a horizontal cross-section taken on the line 2—2 of Fig. 1.

Fig. 3 is a horizontal cross-section of the fluid-packed seal taken on the line 3—3 of Fig. 1.

Fig. 4 is an enlarged vertical sectional view of the fluid-packed seal when the motor is in operation.

Fig. 5 is an alternative form of sealing device.

Referring specifically to the drawing, a motor 10 has a shell 11. The shell 11 is composed of a cylindrical side wall 12 closed at its top by a cover plate 14 suitably secured thereto, and at its lower end by a lower wall 15 which converges downward in the shape of a cone. An upper intermediate wall 17, suitably secured to the side wall 12, carries an upper bearing 19 concentric with the axis of the cylindrical side wall 12. A lower intermediate wall 20 carries a lower bearing 22 which is also concentric with the axis of the side wall 12.

Rotatably supported by the bearings 19 and 22 is a shaft 25 which carries a rotor 26 in a motor chamber 27 between the intermediate walls 17 and 20. The upper bearing 19 is preferably a thrust bearing adapted to carry the weight of the rotor 26 and may be designed to support any auxiliary apparatus which the motor 10 is adapted to operate. Such an auxiliary apparatus is indicated at 28, but forms no part of the invention. Surrounding the rotor 26 is a motor winding 30 which is supplied with electrical energy through conductors 31 which pass through the upper intermediate wall 17 through a hole 32. An insulator 34 mounted in fluid-tight relationship with the cover plate 14 carries these conductors to the exterior of the motor shell 11 whence they connect to a suitable source of electrical energy adapted to operate the motor 10.

Secured to the lower wall 15 is an apron 40 of a fluid-packed emulsion-preventing seal 41. This apron surrounds and is concentric with the shaft 25 and has an inner diameter which is larger than the diameter of the shaft, allowing a clearance space 42 between the apron and the shaft, as clearly shown in Figs. 1 and 4. The lower portion of the apron 40 is flared into a circular radial plate 45.

Secured to the shaft 25 directly below the radial plate 45 by a set screw 47 is a cup 48. A cover 50 is suitably secured to the top of the cup 48 by means not shown. This cover 50 has a central opening 51 through which the apron 40 extends, leaving a clearance space 53 therebetween.

This cup 48 together with the apron 40 forms the fluid-packed seal of the invention. Mercury or any other fluid substance of a high density is poured into the cup 48 until it is substantially half filled as shown in Fig. 1. When the shaft is rotated, the cup 48 and the mercury contained therein are also rotated. The centrifugal force on the mercury causes it to flow outward in the cup 48 and assume a position substantially as indicated at 54 in Fig. 4. When thus rotating, the upper surface of the mercury forms a paraboloid. The radial plate 45, however, is designed so that the outer periphery thereof is always beneath the surface of the mercury irrespective of the speed of rotation of the shaft. The mercury thus effectively seals the fluid surrounding the motor from the space inside the shell 11.

It is desirable that the pressure inside the shell 11 be substantially equal to the pressure outside thereof so that the mercury in the cup 48 will not be forced one way or the other around the radial plate 45 due to an inequality of pressure in the clearance spaces 42 and 53. Such a pressure-equalizing means is shown in Fig. 1 in the form of bellows 55 which are secured in openings 56 of the lower wall 15. These bellows consist essentially of a plate 57 having corrugated cylindrical side walls 58, and their function is to act substantially as a diaphragm between the outer and inner portions of the shell 11. An increase in external pressure over the pressure inside the shell 11 will cause the circular plate 57 to move inward, thus decreasing the volume inside the shell and raising the internal pressure. Conversely, when the pressure inside the shell 11 is greater than that outside, the plate 57 will move outward or toward the lower wall 15, thus decreasing the internal pressure to a value equal to the outside pressure. The action of the bellows 55 is essentially adapted to increase or decrease the volume of the shell 11, depending on whether the plates 57 are moved inward or outward with respect to the lower wall 15.

In operation a supply of mercury is inserted in the cup 48 after which the motor 10 is completely filled with a lubricating medium which is not injurious to the electrical windings through a port 60. Enough lubricating medium is forced into the shell 11 to lower the bellows 55 so that the plates 57 approach the lower wall 15. The port 60 is then closed by a plug 61 and the motor 10 is lowered into the fluid and suitably held in place by means not shown. When submerged, the clearance space 42 will contain lubricating medium and the space 62 above the mercury in the cup 48, which communicates with the exterior fluid through the clearance space 53, will be filled with the external fluid. The bellows 55 effectively equalize the pressures inside and outside of the shell 11 so that the level of the mercury in the clearance space 42 will be the same as the level of the mercury in the space 62 surrounding the apron 40. When the motor is energized, a small volume of lubricating medium will flow through the clearance space 42 to take the place of the mercury displaced by the rotation of the cup 48. This flow is made possible by the bellows 55 which expand inward from the wall 15 slightly to compensate for the lowering of the mercury level in the clearance space 42. Simultaneously, a volume of the fluid in the space 62 is forced out of the space 53.

The motor 10 is made substantially fluid-tight, but even should a slight leakage occur the bellows 55 would insure that the pressures inside and outside the shell 11 were always equalized.

It is not absolutely necessary to use a fluid-packed seal as shown in Fig. 1, for an ordinary packing means may be substituted. Fig. 5 shows such a packing means. The shaft 25 here extends through an opening 63 in the lower wall 15 and through a packing nut 65 which is threaded in a cylindrical projection 66 of the lower wall 15 as indicated at 67. Packing 68 is compressed in the cylindrical projection 66 between the lower wall 15 and the packing nut 65. Such a packing is well known in the art and is effective in certain installations in preventing a flow of fluid from the outside of the shell 11 to the inside thereof or vice versa.

It is also sometimes possible to successfully dispense with the bellows 55 with such a packing as shown in Fig. 5. However, this arrangement is open to the objection that the fluid may be under a higher pressure than the lubricating medium inside the shell 11, in which case the fluid may eventually pass along the shaft 25 through the packing 68 and reach the interior of the shell 11 where it will mix with the lubricating medium. Such a leakage is relatively slow especially if a high grade packing 68 is used, and motors may be submerged for a considerable time before the lubricating medium will be contaminated enough to affect its usefulness.

We have found it more effective, however, to use a pressure-equalizing means such as the bellows 55 when an ordinary packing such as is indicated in Fig. 5 is used. The bellows will equalize the pressures inside and outside the shell 11, as previously described, and there will thus be no unbalanced pressure forcing either the lubricating medium or the fluid past the packing 68.

It is also possible to operate the motor of our invention by dispensing with the pressure-equalizing means and using only the fluid-packed seal. This is made possible by a peculiar property of the seal which will now be described. With such a combination of fluid-packed seal and no bellows, an increase in fluid-pressure in the space 62 over that in the motor 10 will cause a rise in the level of mercury in the space 42. This new difference in level will be proportional to the difference in pressure of the lubricating medium and the fluid. In order that any fluid reach the inside of the motor, it would be necessary to lower the level of the mercury in the space 62 to the lower edge of the radial plate 45. This volume of mercury displaced would rise in the space 42. Inasmuch as the cross-sectional area of the space 42 is many times less than that of the space 62, it follows that the rise in the space 42 must be many times higher than the lowering of level in the space 62. Thus a large difference in pressure would have to exist before the fluid could reach the inside of the motor 10. This pressure could be made as large as desirable by making the apron 40 concentric with the shaft 25 over a greater vertical distance.

However, should the pressure inside the motor be greater than the pressure of the fluid outside thereof, the level of the mercury in the space 42 will have to lower a relatively short distance before some of the lubricating medium can escape, thus relieving the excess pressure. When the motor is not operating, this distance is represented between the mercury level shown in Fig. 1 and the lower edge of the radial plate 45. When the motor is operating it will be the distance between the surface of the mercury and the outer edge of the plate 45. Thus, while it would be relatively easy to release an excess of pressure from inside the motor, it is extremely difficult for any external fluid to pass the fluid-packed seal. It should be clear that this escape of fluid or lubricating medium would take place only in the absence or inoperativeness of the pressure-equalizing means such as the bellows 55. Normally the fluid-packed seal itself acts to balance the pressures up to the point where fluid or lubricating medium actually flows through the mercury after sufficiently displacing it.

It should be understood that we are not limited to the use of the specific packing or specific fluid-packed seal shown, any means for effectively separating the lubricating medium inside of the shell 11 from the fluid outside the shell 11 falling within the scope of our invention. Neither are we limited to the use of bellows as a pressure-equalizing means, for any of numerous equivalents might be employed. Such equivalents might include diaphragms, balancing chambers, stand pipes, etc.

Our fluid-packed seal, however, has peculiar properties which makes it especially advantageous in this installation. It would, of course, be within the scope of this invention to so arrange the seal 41 that the mercury itself would be stationary and the apron revolve. We have found this to be effective on shafts which rotate relatively slowly. In applying this arrangement to high speed shafts, however, we find that the fluid and the lubricating medium has a tendency to emulsify with the mercury. By making the mercury rotate this effect is not produced, for any emulsification which might start is immediately corrected due to the large centrifugal force on the mercury relative to the centrifugal force on any emulsifying agent.

The present invention is an improvement on the apparatus shown and claimed in our co-pending application, Serial No. 114,414, in which is disclosed a submersible structure including a different type of balance system and in which no body of internal liquid is entrapped in the shell, the liquid in that application having free access to a surge means so that it can flow into and from the shell through the action of the pressure equalizing means.

We claim as our invention:

1. In a submersible motor, the combination of: a shell; a stator carried by said shell; a shaft rotatably supported relative so said shell, said shaft extending through said shell; a rotor on said shaft and cooperating with said stator in turning said shaft; a cup on said shaft; a fluid sealing means carried by said cup into which is extended an apron secured to said shell; and a bellows arrangement for equalizing the internal and external pressures on said shell.

2. In combination: a shell completely filled with an imcompressible lubricating medium before being submerged in an external liquid, the upper end of said shell being completely closed off to entrap said lubricating medium therein when said shell is submerged; a rotatable shaft extending from said shell; a cup carried by said shaft and containing a body of sealing liquid; an apron extending downward around said shaft to a point below the surface of said sealing liquid, there being an annular space between said shaft and said apron which is filled with said lubricating medium whereby said lubricating medium contacts the surface of said sealing liquid in said annular space, the surface of said sealing liquid around said apron being contacted by said external liquid whereby said body of liquid is displaceable by any increase or decrease of the volume of said entrapped lubricating medium; and variable volume means for substantially equalizing the pressures exerted on said sealing liquid by said lubricating medium and said external liquid and compensating for any change in volume of said lubricating medium to prevent disrupting displacement of said sealing liquid.

3. In combination: a shell submerged in an external liquid and entrapping a mass of internal liquid therein; a motor in said shell and operating in said internal liquid; a shaft on said motor and extending through said shell; a cup mounted on said shaft adjacent the junction of said shaft and said shell and adapted to retain a body of sealing liquid therein; and an apron extending downward from said shell to a point below the surface of said sealing liquid in a manner to provide separated surfaces of said sealing liquid, one of said surfaces being in pressure-transferring relationship with said internal liquid and the other of said surfaces being in pressure-transferring relationship with said external liquid.

4. In combination: a shell submerged in an external liquid and entrapping a mass of internal liquid therein; a motor in said shell and operating in said internal liquid; a shaft on said motor and extending through said shell; a cup mounted on said shaft adjacent the junction of said shaft and said shell and adapted to retain a body of sealing liquid therein; an apron extending downward from said shell to a point below the surface of said sealing liquid in a manner to provide separated surfaces of said sealing liquid, one of said surfaces being in pressure-transferring relationship with said internal liquid and the other of said surfaces being in pressure-transferring relationship with said external liquid; and means for substantially equalizing the pressures exerted on said sealing liquid by said internal and external liquids.

5. In combination: a shell submerged in an external liquid and entrapping a mass of incompressible liquid therein, said internal liquid substantially filling said shell; a rotatable shaft extending from said shell; and means for retaining a body of sealing liquid around said shaft at the junction of said shaft and said shell, said sealing liquid providing separated surfaces, one of said surfaces being in pressure-transferring relationship with said external liquid, the other of said surfaces being in pressure-transferring relationship with said internal liquid, said sealing liquid being displaceable by any difference in pressure existing between said internal and external liquids, the incompressibility of said internal liquid preventing such an inward displacement of said sealing liquid as would allow external liquid to enter said shell.

In testimony whereof, we have hereunto set our hands at Los Angeles, California, this 29th day of January, 1932.

EARL MENDENHALL.
JUNIUS B. VAN HORN.